(12) United States Patent
Yerli et al.

(10) Patent No.: US 11,949,728 B2
(45) Date of Patent: Apr. 2, 2024

(54) SYSTEM AND METHOD FOR OPTIMIZING VIRTUAL WORLD COMPUTATIONS THROUGH AN N-TIER ARCHITECTURE

(71) Applicant: TMRW Foundation IP S. À R.L., Luxembourg (LU)

(72) Inventors: Cevat Yerli, Frankfurt am Main (DE); Prashanth Hirematada, Frankfurt am Main (DE)

(73) Assignee: TMRW Foundation IP S. À R.L., Luxembourg (LU)

( * ) Notice: Subject to any disclaimer, the term of this patent is extended or adjusted under 35 U.S.C. 154(b) by 586 days.

(21) Appl. No.: 17/138,672

(22) Filed: Dec. 30, 2020

(65) Prior Publication Data

US 2021/0203756 A1    Jul. 1, 2021

Related U.S. Application Data

(60) Provisional application No. 62/955,239, filed on Dec. 30, 2019.

(51) Int. Cl.
*H04L 67/01* (2022.01)
*G06F 8/20* (2018.01)
(Continued)

(52) U.S. Cl.
CPC .......... *H04L 67/01* (2022.05); *G06F 16/2379* (2019.01); *H04L 41/0806* (2013.01); *H04L 67/34* (2013.01); *G06F 8/20* (2013.01)

(58) Field of Classification Search
None
See application file for complete search history.

(56) References Cited

U.S. PATENT DOCUMENTS 6,348,927 B1     2/2002 Lipkin
11,524,234 B2 *  12/2022 Salik .................. A63F 13/5252
(Continued)

FOREIGN PATENT DOCUMENTS

| JP | 2010525422 A  | 7/2010 |
| JP | 2019-526868 A | 9/2019 |
| WO | 2018/053122 A1| 3/2018 |

OTHER PUBLICATIONS

Office Action dated Oct. 25, 2022 in Japanese application No. 2020-213598, filed Dec. 23, 2020, 11 pages.

(Continued)

*Primary Examiner* — Ronald Laneau
(74) *Attorney, Agent, or Firm* — Bryan Cave Leighton Paisner LLP

(57) ABSTRACT

Systems and methods for optimizing virtual world computations through an n-tier architecture including at least three tiers are provided. In a sample three-tier architecture, a first tier comprises a client software engine configured to receive input data, send the data to the second tier, and perform end-user processing. A second tier connects to the first tier and to a third tier through a network and comprises a client-dedicated module that is dynamically instantiated and which is configured to either prepare the received data for subsequent processing from the client software engine or send the received data to the third tier. The third tier comprises a virtual world processing module configured to receive and process data from the second tier, generating world state updates, and to dynamically instantiate the client-dedicated module to spawn client-dedicated instances. The world state updates are sent to corresponding client-dedicated module instances for further processing.

20 Claims, 11 Drawing Sheets

(51) Int. Cl.
  *G06F 16/23* (2019.01)
  *H04L 41/0806* (2022.01)
  *H04L 67/00* (2022.01)

(56) References Cited

U.S. PATENT DOCUMENTS

| | | |
|---|---|---|
| 2008/0220873 A1 | 9/2008 | Lee et al. |
| 2013/0332574 A1 | 12/2013 | Lin et al. |
| 2015/0258438 A1 | 9/2015 | Tait et al. |
| 2015/0379046 A1 | 12/2015 | Sundaresan et al. |
| 2021/0201437 A1* | 7/2021 | Yerli ............... G06T 17/005 |
| 2022/0054945 A1* | 2/2022 | Salik ............... A63F 13/87 |
| 2023/0107385 A1* | 4/2023 | Salik ............... A63F 13/52 |
| | | 463/31 |

OTHER PUBLICATIONS

Mumme, C., et al., "A Framework for Interaction Analysis and Feedback in Collaborative Virtual Worlds," 2008 IEEE International Technology Management Conference (ICE), Lisbon, Portugal, Jun. 23-28, 2008, 8 pages.

Gupta, A., et al., "Cloud Gaming: Architecture and Quality of Service," Career Point University Hamipur-Research Journal: 1(2), pp. 19-22, 2015.

Abrams, H.A., et al., "Extensible Interest Management for Scalable Persistent Distributed Virtual Environments," doctoral thesis, Naval Postgraduate School, Monterey, California, Dec. 1999, pp. i-220.

Ciampi, M., et al., "A Collaborative Architecture for Healthcare Applications," International Journal on Information, 11 pages, Feb. 2012.

Fuhrer, P., et al., "Massively Distributed Virtual Worlds a Framework Approach MaDViWorld: a Java Software Framework for Massively Distributed Virtual Worlds," Lecture Notes in Computer Science, 2604:111-121, Feb. 2003.

Jurgelionis, et al., "Platform for Distributed 3D Gaming," International Journal of Computer Games Technology, V. 2009, Article ID 231863, pp. 1-15, May 2009.

Müller, M., et al., "Screen Space Meshes," ACM SIGGRAPH/Eurographics Symposium on Computer Animation, San Diego, California, Aug. 2007, 7 pages.

Extended European Search Report dated May 6, 2021, issued in corresponding European Application No. EP 20 21 7091, 9 pages.

A. Pessoa Negrao et al., "On-Demand Resource Allocation Middleware for Massively Multiplayer Online Games," 2014 IEEE 13th International Symposium on Network Computing and Applications, Aug. 21, 2014, pp. 71-74.

S.A. Abdulazeez et al., "Dynamic Area of Interest Management for Massively Multiplayer Online Games Using OPNET," 2017 10th International Conference on Developments in eSystems Engineering (DESE), IEEE, Jun. 14, 2017, pp. 50-55.

M. Ghobaei-Arani et al., "An Autonomous Resource Provisioning Framework for Massively Multiplayer Online Games in Cloud Environment," Journal of Network and Computer Applications, vol. 142, Jun. 7, 2019, pp. 76-97.

Office Action dated Apr. 26, 2022, in Japanese application No. 2020-213598, filed Dec. 23, 2020, 10 pages.

Yamamoto, S., et al., "QoS Adaptation for Realizing Interaction between Virtual and Real Worlds in Pervasive Networks," Information Processing Society of Japan, Jun. 29, 2007, vol. 2007, No. 1, pp. 1690-1699.

* cited by examiner

SYSTEM AND METHOD FOR OPTIMIZING VIRTUAL WORLD COMPUTATIONS THROUGH AN N-TIER ARCHITECTURE

CROSS-REFERENCE TO RELATED APPLICATION

This application claims the benefit of U.S. Provisional Application No. 62/955,239, filed on Dec. 30, 2019, which is incorporated herein by reference.

BACKGROUND

A software architecture is a style and method of design and construction of a software system. Software architectures can be divided into tiers, wherein each tier is a logical or functional partitioning of the software architecture defining a group of technologies providing one or more services to its clients. Over time, system architectures have evolved from monolithic architectures where presentation, application logic and resource management were merged into a single tier, to multi-tiered or n-tier architectures where the logical or functional elements are separated into two or more tiers. For example, a two-tier architecture separates the presentation tier from application logic and resource management in another tier. This type of architecture presents portability, is easily maintained and exhibits a high speed of communication because of direct client-server communication, but it presents scalability issues for applications that required a big number of entities. Requirements of more scalability and flexibility led to the creation of the three-tier architecture, which typically comprises a presentation tier, a business or data access tier, and a data tier. This architecture allows each component to take part to several applications at the same time, exhibiting high performance, improved scalability, reusability, flexibility and manageability than the previous architectures. This is the main architecture being used today for most web and traditional applications.

The three-tier architecture, however, presents certain limitations that hinder its use in highly resource-demanding applications, such as those related to virtual worlds. Conventional systems using a three-tier architecture designed to run virtual worlds and, especially, massively multiplayer online games (MMOGs) are limited in the way they scale to support very large numbers of players or entities within the virtual worlds. As these virtual worlds are usually run on a single physical computer and are reliant on a single instance of the game or application, the virtual worlds are thus supported by the limited bandwidth of the system and the processor capacity of a server hosting the virtual world. The server, hosting a game or simulation engine, is required to provide the simulation capabilities for every object and user in the virtual world. However, as the number of players and entities increases, resource requirements increase as well, decreasing the quality of service (QOS) and user experience within the virtual world. As the virtual worlds become larger and more complex, the current implementations of the three-tier architecture prove not to be enough to enable for enough scalability and flexibility.

For the above case of MMOGs, which can likewise apply to any type of interactive application within large virtual worlds, generally three types of real-time remote rendering and computing systems have been used: 3D graphics streaming, video streaming, and video streaming with post-rendering or post-processing operations. In 3D graphics streaming, the server sends the graphics-related commands to the client device, which then interprets and renders the corresponding scene. Thus, the client device needs to be able to both render the streamed 3D graphics and process user input. In video streaming, the server renders the 3D commands and sends the video stream to the client device. This may result in sub-utilization of the hardware capabilities of client devices and an increase in the load and network traffic for the cloud server, as well as a higher latency, but enables the utilization of client devices with low capabilities. In the third alternative, the heavy work of rendering the 3D graphics is performed by the server, while some low processing is completed on the client side via a thin client. A good balance of low latency and high scalability and reusability is yet to be found with the current n-tier architecture designs.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The present disclosure generally relates to computer systems and methods, and more specifically to a system and method for optimizing virtual world computations through an n-tier architecture.

Described embodiments of n-tier architectures of the current disclosure comprise at least three tiers including a first tier comprising a client software engine configured to receive input data, send the input data to the second tier, and perform end-user processing of the input data; a second tier connected to the first tier and to a third tier through a network, the second tier comprising a client-dedicated module that is dynamically instantiated per client device by a third tier and which is configured to, depending on the type of input data, either prepare the input data for subsequent processing from the client software engine of the first tier, or send the input data to the third tier; and the third tier comprising a virtual world processing module configured to receive and process the input data from the second tier in order to generate world state updates, and to dynamically instantiate the client-dedicated module to spawn client-dedicated module instances. The world state updates are sent to corresponding client-dedicated module instances for further processing.

In some embodiments, the client software engine is stored in memory of at least one client device and is executed by at least one processor of the at least one client device. In some embodiments, the client-dedicated module and the virtual world processing module are stored in memory of one or more cloud server computers and are executed by at least one processor of the one or more cloud server computers. For example, the client-dedicated module is stored in memory of at least one cloud server computer and is executed by at least one processor of the at least one cloud server computer, and the virtual world processing module is stored in memory of the same or a different cloud server computer and is executed by at least one processor of the same or different cloud server computer.

In some embodiments, the n-tier architecture of the current disclosure may be implemented in a cloud-to-edge infrastructure that may display distributed computing capabilities employing computing devices and computing systems such as public or private clouds, fog servers, cloudlets, peer-to-peer cloud server systems, and edge devices and systems, such as enterprise systems, mobile platforms, and user devices, all of which may connect through a network.

The different tiers presented as part of the several n-tier architectures according to embodiments of the current disclosure can thus be hosted in at least some of the computing devices and systems of the cloud-to-edge infrastructure (e.g., through so-called infrastructure as a service, or IaaS). In some embodiments, the n-tier architecture is implemented in a distributed ledger enabling a decentralized and immutable data storage and processing.

In some embodiments, the client software engine is further configured to identify one or more portions of the input data for processing by different modules, e.g., the client-dedicated module or the virtual world processing module, based on the type of the input data. In an embodiment, the client software engine is further configured to identify data as high interaction frequency data or low interaction frequency data, wherein the high interaction frequency data is processed by the client-dedicated module, and wherein the low interaction frequency data is sent to the virtual world processing module for processing thereby. In a further embodiment, the high interaction frequency data comprises high priority data, while the low interaction frequency data comprises low priority data. Being able to classify the data for processing by the client-dedicated module or the virtual world processing module, e.g., as high interaction frequency data or low interaction frequency data, enables an automated and efficient way of offloading only necessary data and tasks to suitable tiers.

In some embodiments, the client-dedicated module is implemented as instructions stored in memory of the at least one cloud server computer. In another embodiment, the client-dedicated module is implemented as a client-dedicated virtual machine stored in memory of the at least one cloud server computer. In these embodiments, the client-dedicated module, when instantiated by the virtual world processing module, dedicates a specific amount of resources (e.g., memory, network and computing power) and other server properties, such as operating system, to the client device in question and implements one or more data preparation operations on the data using the client-dedicated instance.

In some embodiments, the at least one processor of the at least one cloud server computer comprises a generic processing unit, a special-purpose processing unit, or a combination thereof. The at least one processor can be assigned on demand during per client instantiation via the virtual world processing module. Assigning at least one hardware processor to an instance of the client-dedicated module can provide further resources that are then available for processing of data, resulting in higher QOS and quality of experience (QOE) to the end-user.

In some embodiments, the input data received by the client software engine comprises one or more of color data, geometry data, depth data, audio data, pose data, sensor data, and user input commands. In other embodiments, the prepared data from the client-dedicated module comprises color data, geometry data, depth data, and audio data that gets streamed to the client software engine. In yet further embodiments, part of the prepared data is data that has been processed by the virtual world processing module. In yet further embodiments, the per-client processing further comprises data encoding. In yet further embodiments, the geometry data comprises screen-space mesh grids, or proxy geometries, or combinations thereof.

In some embodiments, the client software engine is further configured to perform one or more of generating intermediary frames enabling increasing final image resolution; providing complementary image frames; interpolating frame rates; extrapolating frame rates; rendering prepared data; adjusting brightness, colors, contrast, sharpness and resolution; decoding data; and overlaying image data on received data; or combinations thereof. Operations performed by the client software engine are, in some embodiments, performed on data prepared by the client-dedicated module.

In some embodiments, during an application development stage, developers are enabled, through the client software engine, to adjust the amount (e.g., by percentage) of processing performed by each tier. In some embodiments, said adjustment to the amount of processing is performed by defining classifications or types of data (e.g., the level of high and low interaction frequency data) that is processed by the client-dedicated module and by the virtual world processing module.

In some embodiments, the third tier comprises a virtual world system. In an embodiment, the virtual world processing module connects to a database (e.g., hosted in the third tier) comprising a virtual world system comprising a plurality of sub-universes, each sub-universe comprising a plurality of virtual objects. In further embodiments, at least some of the plurality of virtual objects are virtual replicas of corresponding real world objects located in corresponding areas of the real world, wherein processing by the virtual world processing module is performed to the plurality of virtual objects within areas of interest. In yet further embodiments, the virtual objects further comprise applications and purely virtual objects that do not have a counterpart real-world object.

In some embodiments, the virtual world processing module is further configured to provision one or more application services, wherein said provisioning is based at least in part on a spatial context associated with one or more content contexts through the virtual world system. In an embodiment, the virtual world processing module is further configured to organize and provision, through the virtual world system, one or more application services comprising, for example, mobility, security, energy management, recommendations, commercial transactions, and the like. The organization and provisioning of application services may be based at least in part on a spatial context associated with one or more content contexts through the virtual world system. The application services may be allocated and sent to the client software engine on request through the corresponding client-dedicated module. In further embodiments, the spatial context is classified into a micro-context or macro-context. In an embodiment, each of the micro-context or the macro-context may be further classified as private or public contexts that are available to specific client software engines through the corresponding client dedicated-module. In some embodiments, the application services and related content associated with the private context is delivered based on interest systems, entitlement rules, or any suitable application service prioritization criterion.

In some embodiments, the virtual world system may comprise a virtual world layer that may be separated into an augmented reality (AR) layer and virtual reality (VR) layer. The separate layers may enable accessing the virtual world system in any of augmented or virtual reality and combining elements stored in each layer, and may be activated through client devices connected the at least one cloud server computer through the network whenever accessing one or the other type of reality. Each of the layers may comprise augmentations of reality and virtual objects that may be specific to each layer. In some embodiments, the state of the at least one portion of the world is updated by a plurality of connected devices including sensors providing sensor data to the persistent virtual world system, by user input, by server computations, or combinations thereof.

According to an embodiment, a method enabling optimization of per-user computations through an n-tier architecture including at least three tiers comprises the steps of receiving, by a client-dedicated module of a second tier, user input data sent by a client software engine configured in a first tier and connected to the second tier through a network. The client-dedicated module sends a first portion of the input data to a virtual world processing module of a third tier of the n-tier architecture connected to the client-dedicated module through the network. For example, if virtual world processing module services are required, the method proceeds by sending, by the client-dedicated module, a first portion of the input data to a virtual world processing module of a third tier connected to the client-dedicated module through the network, the virtual world processing module being configured to process the first portion of the input data in order to generate world state updates, and to dynamically instantiate the client-dedicated module to spawn client-dedicated module instances, wherein the world state updates are sent to corresponding client-dedicated module instances. Then, the method continues by receiving, by the client-dedicated module, the world state updates, and further processing, by the client-dedicated module, world state updates, wherein said processing is performed on a per-client basis, and sending the processed world state updates to the client software engine for performing end-user processing of requests. The method also comprises preparing, by the client-dedicated module, a second portion of the input data received from the client software engine, and sending the prepared data to the client software engine for performing end-user processing of requests. For example, if virtual world processing module services are not required, the method may continue by preparing data by the client-dedicated module received from the client software engine, and sending the prepared data to the client software engine for performing end-user processing of requests.

In some embodiments, the method further comprises, by the client software engine, identifying the second portion of the input data for processing by the client dedicated module and identifying the first portion of the input data for processing by the virtual world processing module. In an embodiment, the client engine tier identifies data as high interaction frequency data or low interaction frequency data, wherein the high interaction frequency data is processed by the client-dedicated module, and wherein the low interaction frequency data is sent to the virtual world processing module for processing thereby in order to generate world state updates.

In some embodiments, the method further comprises, during instantiation of the client-dedicated module by the virtual world processing module, assigning at least one processor to one or more client devices, wherein the at least one processor of the at least one cloud server computer comprises a generic processing unit, a special-purpose processing unit, or a combination thereof.

In some embodiments, the input data received by the client software engine comprises one or more of color data, geometry data, depth data, audio data, pose data, sensor data, and user input commands. In another embodiment, the prepared data from the client-dedicated module comprises color data, geometry data, depth data, and audio data that gets streamed to the client software engine. In further embodiments, the method further comprises encoding of prepared data before being streamed to the client software engine.

In some embodiments, the method further comprises, by the client software engine, performing one or more of generating intermediary frames enabling increasing final image resolution; providing complementary image frames; interpolating frame rates; extrapolating frame rates; rendering prepared data; adjusting brightness, colors, contrast, sharpness and resolution; decoding data; and overlaying image data on received data; or combinations thereof.

In some embodiments, the method further comprises, during an application development stage via the client software engine, adjusting the percentage of processing performed by each tier.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below, and particularly pointed out in the claims filed with the application. Such combinations have particular advantages not specifically recited in the above summary. Other features and advantages of the present disclosure will be apparent from the accompanying drawings and from the detailed description that follows below.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

Specific features, aspects and advantages of the present disclosure will be better understood with regard to the following description and accompanying drawings, where.

DETAILED DESCRIPTION

In the following description, reference is made to drawings which show by way of illustration various embodiments. Also, various embodiments will be described below by referring to several examples. It is to be understood that the embodiments may include changes in design and structure without departing from the scope of the claimed subject matter.

In embodiments of the current disclosure, the term "tier" is used to define a physical or virtual structuring mechanism of a system infrastructure running an application, where each tier is defined logically or functionally. Any system architecture comprising more than one tier is generally known as multi-tiered architecture, or n-tier architecture. An application running on such a system is thus considered to be distributed across the system, as each tier can implement one or more functions of the application in a different physical or virtual computer. Each tier communicates to each other by sending messages through different layers and reaching the respective layers on another tier using corresponding communication protocols.

The current disclosure describes the functional partitioning defining each tier without limiting the scope to the different layers and protocols that can be used within each tier for purposes of data transferring. Thus, benefits of implementing the systems and method of the current disclosure are not strictly tied to the number of tiers used by the system architecture to distributed functions and processes, but rather by how the different data-processing functions are distributed across the system depending on the type of data that is received. Thus, for example, certain types of data trigger a personalized, client-dedicated approach to data processing for 3D virtual worlds, while other types of data enable a virtual world processing for tasks that may affect the virtual world itself and which can accept a higher latency. Furthermore, for purposes of simplification, some embodiments of the current disclosure are described with respect to a three-tier architecture, although those skilled in the art may appreciate that similar embodiments may be implemented in more than three tiers without affecting the scope of the disclosure.

Figure 1A:
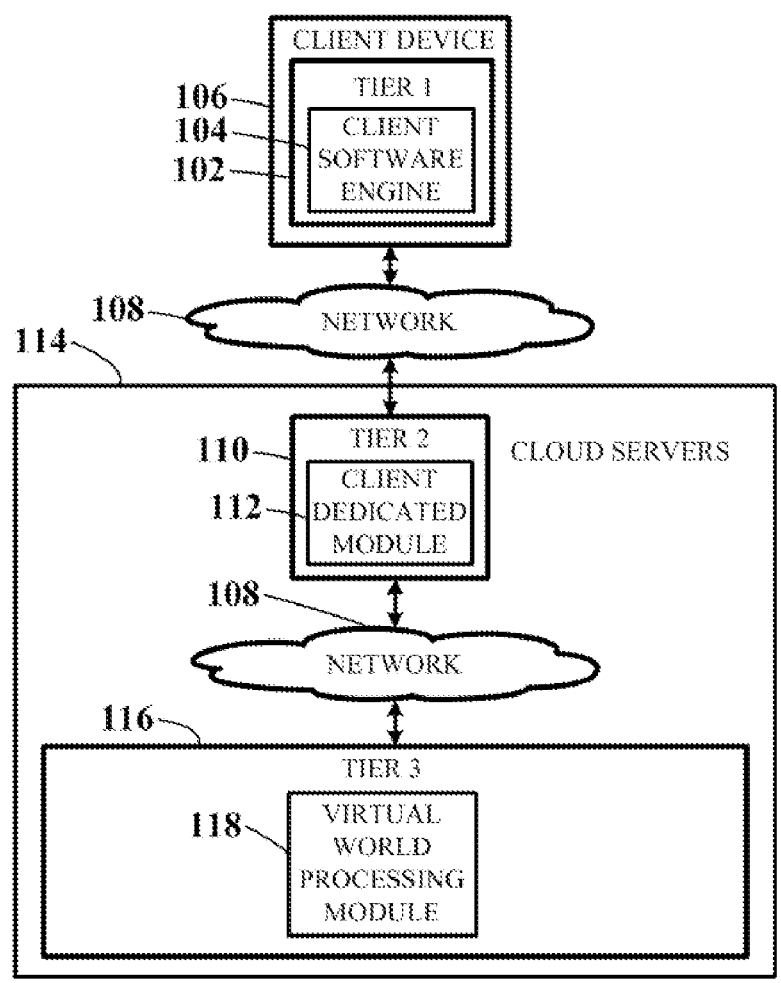
FIGS. 1A-1C depict a schematic representation of a system for optimizing virtual world computations through an n-tier architecture, according to an embodiment.
Figure 1B:
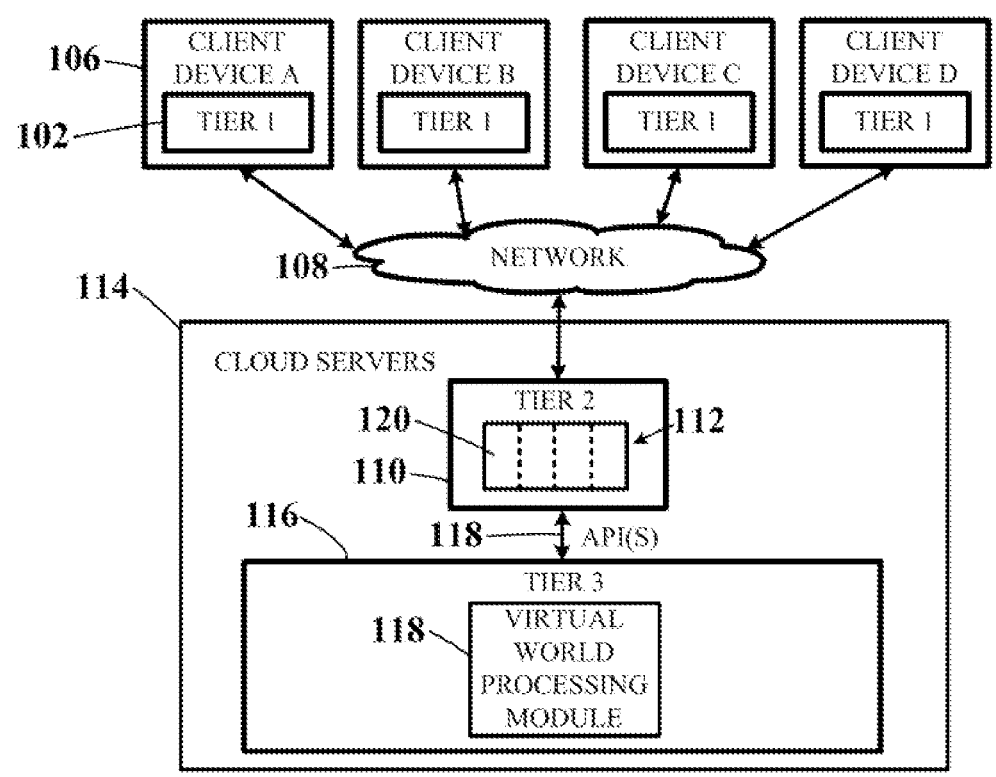
Figure 1C:
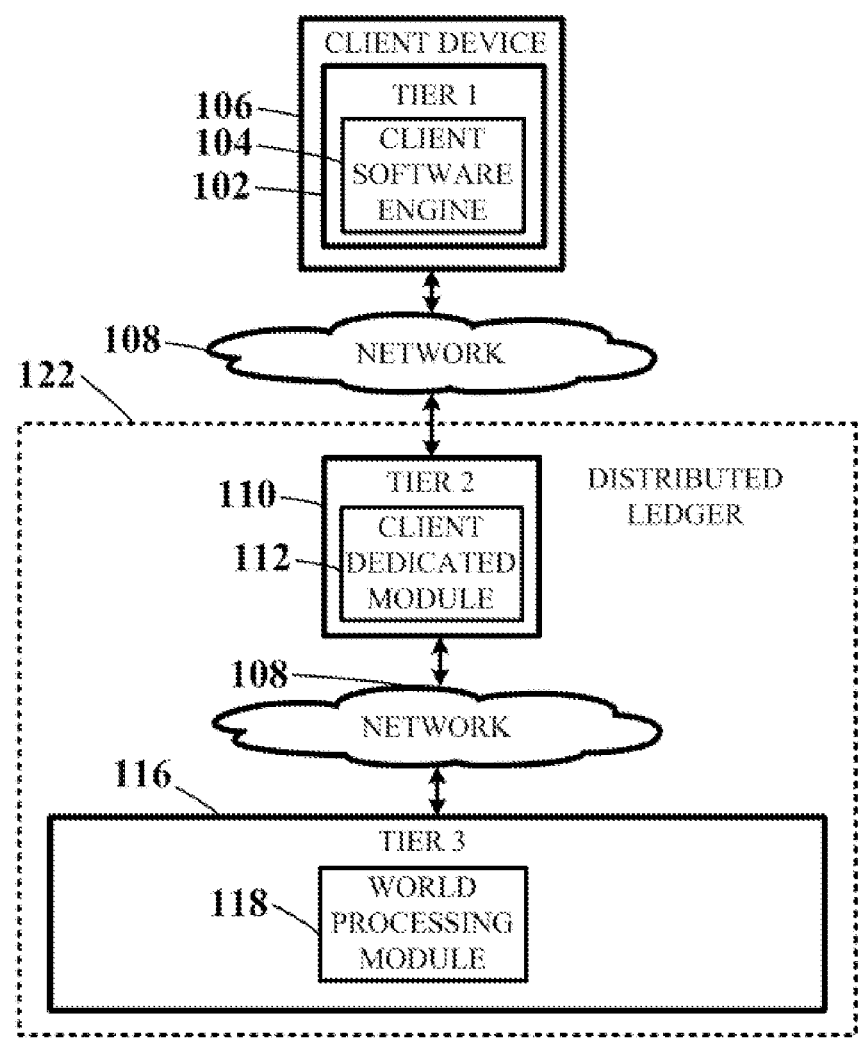

FIGS. 1A-1C depict schematic representations of systems 100a-c for optimizing virtual world computations through an n-tier architecture, according to an embodiment.

With reference to FIG. 1A, system 100a comprises a first tier 102 including a client software engine 104 implemented in a client device 106. The first tier 102 connects through a network 108 to a second tier 110 including a client-dedicated module 112 implemented in at least one cloud server computer 114. The second tier 110 further connects to a third tier 116 via the network 108 and includes a virtual world processing module 118.

In some embodiments, the client software engine 104 is configured to receive input data from the one or more client devices 106, send the input data to the client-dedicated module 112 of the second tier 110 through the network 108, and perform end-user processing of data. In further embodiments, the client-dedicated module 112 is dynamically instantiated per client device by the virtual world processing module 118 of the third tier 116, and is configured to, depending on the type of data, either prepare the data for subsequent processing from the client software engine 104 of the first tier 102, or send the data to the virtual world processing module 118 of the third tier 116. In further embodiments, the virtual world processing module 118 of the third tier 116 is configured to receive and process data received from the second tier 110 in order to generate world state updates, and to instantiate the client dedicated module 112 in order to generate client-dedicated instances. The virtual world processing module 118 may then send the world state updates to client-dedicated instances of the client-dedicated module 112 in the second tier 110 for further processing.

With reference to FIG. 1B, system 100b comprises four client devices 106, client devices A-D, which are connected to the cloud servers 114 through the network 108. In this embodiment, sending at least some of the data received from at least some of the client devices A-D to the virtual world processing module 118 triggers the virtual world processing module 118 to instantiate the client-dedicated module 112, spawning a plurality of client-dedicated instances 120, wherein each instance 120 is dedicated to at least one client device 106. The data is then prepared by the client-dedicated instances 120 and sent to the corresponding client devices 106 as processed or semi-processed data that can be further processed by the corresponding client devices 106.

In some embodiments of the current disclosure, systems 100a-b may be implemented in a cloud-to-edge infrastructure that may display distributed computing capabilities employing computing devices and systems such as public or private clouds, fog servers, cloudlets, peer-to-peer (P2P) cloud server systems, and edge devices and systems, such as enterprise systems, mobile platforms, and user devices, all of which may connect through the network 108. Using a cloud to edge computing network, access to computing power, computer infrastructure (e.g., through so-called infrastructure as a service, or IaaS), applications, and business processes can be delivered as a service to users via client devices 106 on demand. This way, resources including physical servers and network equipment enable a shared storage and computing that may be dynamically allocated. The different tiers presented as part of the several n-tier architectures according to embodiments of the current disclosure can thus be hosted in at least some of the computing devices and systems of the cloud-to-edge infrastructure. By way of example, resources from one or more client devices can be used in a distributed fashion as cloud resources. Thus, for example, the client-dedicated module, which is in some embodiments of the current disclosure hosted in the second tier in the one or more cloud server computers, can be hosted by one or more client devices in a distributed way, such as in a P2P cloud computer system.

FIG. 1C shows an embodiment of a system 100c being implemented in a cloud-to-edge infrastructure comprising a distributed ledger 122. The cloud-to-edge infrastructure comprising a distributed ledger 122 may be a decentralized and immutable blockchain or distributed ledger network that facilitates the transfer and storage of data necessary to widely distribute the n-tier architecture of system 100c.

In some embodiments, in order to reduce hardware and network demands, contribute to the reduction of network latency, and improve the general user experience, the system may connect through a network 108 including millimeter-wave (mmW) or combinations of mmW and sub 6 GHz communication systems, such as through 5th generation wireless systems communication (5G). In other embodiments, the system may connect through wireless local area networking (Wi-Fi). Provided communication systems may allow for low (e.g., about 1 to about 5 millisecond) end-to-end (E2E) latency and high (e.g., 1-10 Gbps) downlink speeds to end points in the field. This results in high-quality, low latency, real-time digital application content streaming. In other embodiments, the system may communicatively connect through 4th generation wireless systems communication (4G), may be supported by 4G communication systems, or may include other wired or wireless communication systems.

According to an embodiment, the client devices 106 comprise sensing mechanisms including a combination of inertial tracking sensing mechanisms and transceivers, wherein data tracked by such combination is available as embedded tracking data or tracking metadata to the sensed datasets. The inertial tracking sensing mechanisms can make use of devices such as accelerometers, gyroscopes, magnetometers, and others, which may be integrated in an inertial measuring unit (IMU), or may be separate from an IMU. In an embodiment, the transceivers are mmW transceivers. In embodiments where mmW antennas are employed, the mmW transceivers are configured to receive mmW signals from the antennas and to send the data back to the antennas. The inertial sensors, and positional tracking provided by mmW transceivers and the accurate tracking, low-latency and high QOS functionalities provided by mmW-based antennas may enable sub-centimeter or sub-millimeter positional and orientational tracking, which may increase accuracy when tracking the real-time position and orientation of the connected elements. In some embodiments, tracking may be implemented by employing several techniques known in the art, such as time of arrival (TOA), angle of arrival (AOA), or other tracking techniques known in the art (e.g., visual imaging, radar technology, etc.). In alternative embodiments, the sensing mechanisms and transceivers may be coupled together in a single tracking module device.

In other embodiments, global navigation satellite systems (GNSS), which refers to satellite-based navigation systems like GPS, BDS, Glonass, QZSS, Galileo, and IRNSS, may be used for enabling positioning of devices. Employing signals from a sufficient number of satellites and techniques such as triangulation and trilateration, GNSS can calculate the position, velocity, altitude, and time of devices. In an embodiment, the external positioning system is augmented by assisted GNSS (AGNSS) through the architecture of existing cellular communications network, wherein the existing architecture comprises 5G. In other embodiments, the AGNSS tracking system is further supported by a 4G cellular communications network. In indoor embodiments, the GNSS is further augmented via radio wireless local area networks such as Wi-Fi, preferably, but not limited to, providing data at 60 GHz. In alternative embodiments, the GNSS is augmented via other techniques known in the art, such as via differential GPS (DGPS), satellite-based augmentation systems (SBASs), real-time kinematic (RTK) systems. In some embodiments, tracking of devices is implemented by a combination of AGNSS and inertial sensors in the devices.

In some embodiments, the client devices 106 comprise user devices and other devices. The user devices may comprise, for example, mobile devices, personal computers, game consoles, media centers, head-mounted displays, and see-through devices (e.g., digital reality contact lenses). The other devices may be configured specifically to capture multi-source data from real world objects via sensor mechanisms in order to update and enrich the virtual replicas of corresponding real-world objects. According to an embodiment, the other devices are one or more surveillance cameras, vehicles, traffic lights, buildings, streets, train-tracks, home appliances, Internet of Things (IoT) devices, and the like.

Figure 2:
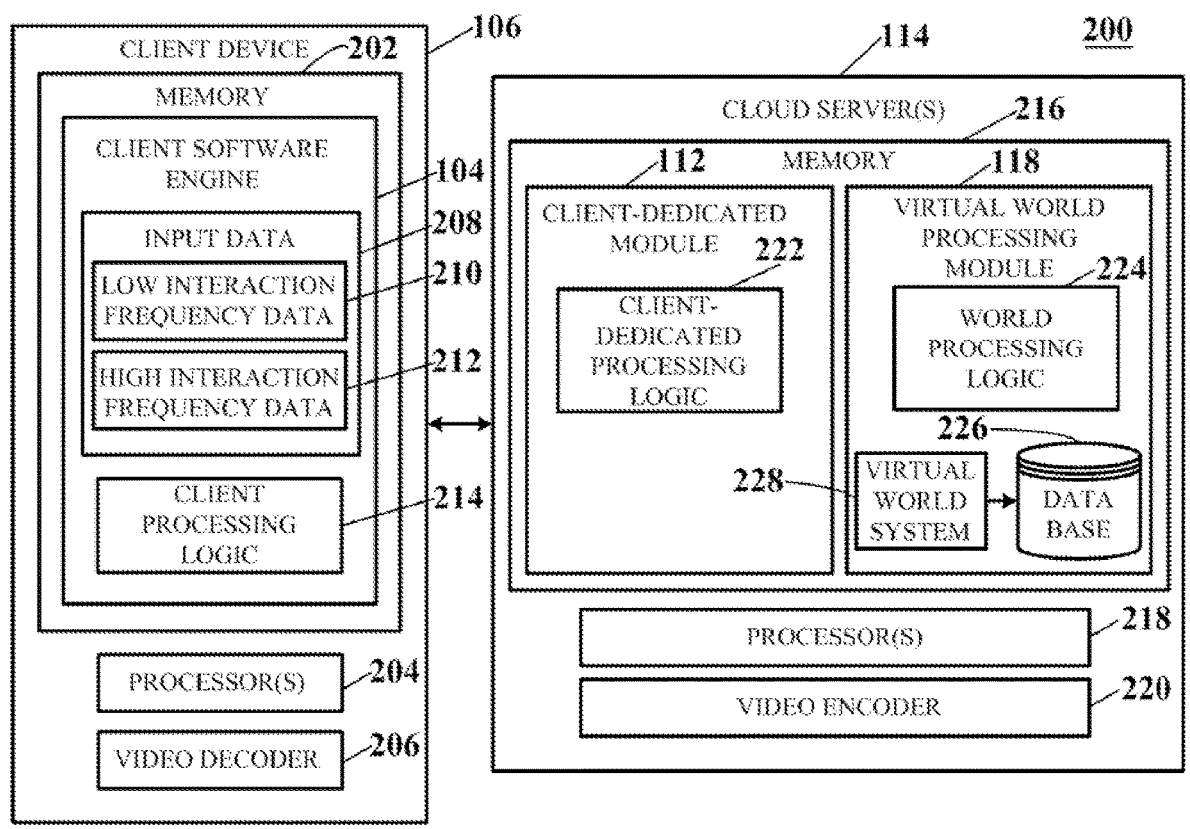
FIG. 2 depicts a schematic representation of a system for optimizing virtual world computations through an n-tier architecture, comprising various software and hardware elements of a client device and one or more cloud servers, according to an embodiment.

FIG. 2 depicts a schematic representation of a system 200 for optimizing virtual world computations through an n-tier architecture, comprising various software and hardware elements of a client device and one or more cloud servers 114, according to an embodiment. Some elements of FIG. 2 may be the same as elements of FIGS. 1A-1C and thus may utilize similar or the same reference numerals.

System 200 of FIG. 2 comprises a client device 106 connected to at least one cloud server computer 114. The client device comprises memory 202, at least one processor 204, and at least one video decoder 206. The memory 202 stores a client software engine 104 receiving input data 208 from one or more user interfaces and/or sensor devices, wherein the client software engine is configured to identify portions of the input data for processing by different modules and/or tiers, depending on the type of input data. In the example shown in FIG. 2, the input data 208 comprises a first classification (e.g., low interaction frequency data 210) and a second classification (e.g., high interaction frequency data 212). Classifying the input data 208 (e.g., as low interaction frequency data 210 and high interaction frequency data 212) enables an automated and efficient way of offloading data and tasks to either of the second tier or third tier. The memory 202 further stores client processing logic 214 comprising logical computer instructions for processing, via the at least one processor 204, at least part of the input data 208.

The cloud server computers 114 of the system 200 comprise memory 216, at least one processor 218, and at least one video encoder 220. The memory 216 stores a client-dedicated module 112 comprising client-dedicated processing logic 222 including logical computer instructions for processing, via the at least one processor 218, at least part of the input data 208. The memory 216 further comprises a virtual world processing module 118 comprising world processing logic 224 including logical computer instructions for processing, via the at least one processor 218, input data 208 transferred by the client-dedicated module 112. The virtual world processing module 118 further comprises a database 226 storing and organizing data of a virtual world system 228 including a plurality of virtual objects, wherein at least some of the virtual objects are virtual replicas of real-world objects.

In some embodiments, the virtual world processing module 118 is further configured to organize, through the virtual world system, one or more application services comprising, for example, mobility, security, energy management, recommendations, commercial transactions, and the like. The nature of the application services may depend on the specific application(s) for which the n-tier architecture of system 200 may be used, and their processing may be defined by the virtual world logic 224 of the virtual world processing module 118. The application services may be allocated and sent to the client software engine 104 on request through the corresponding client-dedicated module 112, and may be provided in any of virtual or augmented reality depending on the current mode of accessing the virtual world system employed by a user.

The organization and provisioning of application services may be based at least in part on a spatial context through the virtual world system. The spatial context refers to data related to the direct or indirect spatial environment (e.g., considering 4D (3 dimensions plus time) coordinates of a user) in the virtual world system. In some embodiments, the spatial context may be associated with one or more content contexts which may determine the types of applications to be provided to users. The content context refers to a theme to which the spatial context may be tied, such as a shopping context, a musical context (e.g., concert), a learning context (e.g., a university or classroom), and the like.

In some embodiments, the spatial context is classified as micro-context or macro-context. The term "micro-context"

refers to the spatial area and elements therein included defined within a given space, e.g., a car, train, a company office, a building floor, an airport, mall, cinema, shop, a school, a library, a restaurant, a bar, and the like. Micro-contexts may include data such as 3D image data, 3D geometries, 3D entities, 3D sensor data, 3D dynamic objects, video data, audio data, textual data, time data, metadata, priority data, security data, positional data, lighting data, temperature data, and quality of service (QOS), and context-specific applications and application configurations, amongst others, of the defined spatial contextual area.

The term "macro-context" refers to the indirect or more distant context surrounding an element. The macro context may comprise or be derived from a plurality of micro-contexts, giving rise to more holistic information of a system, such as the current efficiency of a manufacturing plant, air quality, climate change levels, company efficiency, city efficiency, country efficiency, etc. The macro context may be considered and computed at different levels depending on specified machine learning function and goals, including local level (e.g., office or manufacturing plant), neighborhood level, city level, country level, or even planet level. A macro-context comprising a plurality of micro-contexts may be, for example, a car dealer, where each car is an individual micro-context. The car dealer macro-context may be nested in another macro-context, such as in an industrial complex, where the car dealer may represent a micro-context within the industrial complex macro-context.

In some embodiments, the micro and macro-contexts may be further classified as private or public spatial contexts. A public context may display all elements visible publicly to all users connected to the virtual world system in a given physical or virtual area and receiving services, while a private context may relate to elements visible only to a specific user in a given physical or virtual area. In some embodiments, both public-and-private context-related services are delivered simultaneously to the corresponding client software engines 104 through the client-dedicated module 112.

In some embodiments, the spatial context may further determine the level of computing resources required, allocated and used during processing of application services, such as the processing power used for simulating one or more scenes, the bandwidths used for data traffic, and the memory usage. For example, the spatial context may define the level of detail (LOD) used when rendering (e.g., through the world processing logic 224, client-dedicated module 112 or client software engine 104) images for a user depending on how close or far is the user from a specific element of the real or virtual world, which may influence the level of computing resources employed during said processing.

In further embodiments, the organization and provisioning of services in a private context are available to specific client software engines through the corresponding client-dedicated module based on entitlement rules. The entitlement rules may be defined based on permissions assigned by a human or artificial system administrator, and may be based, for example, on a service contract or other type of agreement. For example, entitlement for receiving public location energy management services may be limited to specific town administration officials, while entitlement for receiving a specific home energy management services may be limited to the corresponding home owner. In some embodiments, entitlement rules are based at least in part on a priority factor. The priority factor may involve providing a different priority score to different types of users, such as a higher score to preferential users (e.g., senior, premium or VIP users) and a lower score to standard users. For example, entitlement rules based on priority may provide a higher LOD to preferential users than to standard users.

In further embodiments, the organization and provisioning of services in a private context are further based on interest systems (e.g., interest graphs, tags, and weights). Interest systems may be derived or applied through a machine learning process that may be implemented by the virtual world processing logic 118 through the world processing logic 224, and may employ user interaction data to "learn" user behavioral patterns that may be used to infer user interests. For example, a restaurant recommendation service using an interest system may provide the user with specific recommendations of restaurants based on the type of restaurants that the user may have visited in the past. In other examples, user interests may also be explicitly added to a user profile by the corresponding user, or may be retrieved from other sources (e.g., social media) upon user authorization. In further embodiments, any other suitable prioritization application service prioritization criterion may be applied.

In an example, a micro-context such as a car can, through sensor devices or network detection, trigger the recognition of a user device being in the car, sending a signal to the virtual world processing module 118 of cloud servers 114 to provide, via the corresponding client-dedicated module 112, specific car-related functionalities that the driver and/or passengers are entitled to obtain within the car micro-context. In this example, the car micro-context is associated with a driving content context, meaning that the application services delivered and the content retrieved may be related to driving. Further in this example, some of the content may be personalized depending on interests and entitlements, such as kids in the car being able to view certain car-racing gaming applications while the car is in motion, while the driver (e.g., the father) may receive driving assistance-related content, such as digitally viewing or being alerted about speed limits, traffic jams, roadway shortcuts, and the like. In an example of a shopping mall micro-context, the system 200 may automatically retrieve from the virtual world processing module 118 application content related to brands available in the vicinity of the user, which may be classified by specific brands, types of clothes, colors, sizes, and the like. In various examples in the field of entertainment, application service live content of, for example, a sport match, e-sport, live musical, film, etc., in view of the related spatial context and content context may, through system 200, display content related to the corresponding entertainment venue to users via the client device 106. The provided content may be further modified through the system 200 depending on the user specific interests, entitlements, and specific content context. In an example of an airport macro-context, a network detecting a client device 106 may trigger the virtual world processing module 118 of the cloud servers 114 to provision the client software engine 104 through the client-dedicated module 112 one or more public airport services in a public context. However, in a private context, the system 200 may take into account the data knowledge of a user owning a digital ticket of a specific airline, which may provide further airline specific refinement of contextual applications prioritization to the user in his or her private context. In the above examples, once the application services and initial content are delivered to the client software engine 104, distribution of computing tasks may alternate between the various processing modules (client software engine 104, client-dedicated module 112, or virtual world processing module 118) depending on the type of data (e.g., low interaction frequency data and high interaction frequency data 210 and 212).

As may be viewed from the above examples, the system 200 enables organizing and providing application services related to the spatial context associated with the physical space of the venues in a micro or macro-context and with a corresponding content context. The venues, accessed through the virtual world system 228, may thus in a first degree enable spatial contextualization of the client experience, and in a second degree may enable further refinements related to a user's personal interests and entitlements, enabling a highly targeted, contextual relevant experience to the user that is processed in an efficient manner through the n-tier architecture of system 200.

In the current disclosure, the low interaction frequency data 210 refers to data that does not require an immediate processing but which concerns multiple or all users of the virtual world system 228, such as data related to world background, weather, or to actions upon objects that are considered to have a low priority. The high interaction frequency data 210 refers to data that requires immediate processing, such as in situations where only a minimum delay is expected or required. Thus, in the examples provided above, once application services and related content are initially delivered by the virtual world processing module 118 to the client software engine 104 via the client-dedicated module 112, the distribution of the data-processing tasks may depend on the type of data to be processed, such as to whether the data is low interaction frequency data 210 or high interaction frequency data 212.

In some embodiments, the memories 202/216 may be of any suitable type capable of storing information accessible by processors 204/218, including a computer-readable medium, or other medium that stores data, e.g., input data 208, that may be read with the aid of an electronic device, such as a hard-drive, memory card, flash drive, ROM, RAM, DVD or other optical disks, as well as other write-capable and read-only memories. The memories 202/216 may include temporary storage in addition to persistent storage. Instructions (e.g., client processing logic 214, client-dedicated processing logic 222 and world processing logic 224) may be executed directly (e.g., machine code), or indirectly (e.g., scripts) by the processors 204/218, respectively. The instructions may be stored in object code format for direct processing by the processors 204/218, or in any other computer language including scripts or collections of independent source code modules that may be interpreted on demand or compiled in advance. Data may be retrieved, stored, or modified by the processors 204/218 in accordance with the instructions. Data may, for example, be stored in computer registers, in a relational database as a table having a plurality of different fields and records, XML documents, or flat files, amongst others. The data may also be formatted in any computer-readable format.

In some embodiments, the at least one processor 218 of the at least one cloud server computer of the cloud server computer 114 is a generic processing unit, a special-purpose processing unit, or combinations thereof. The at least one processor 218 can be assigned on demand during per client instantiation via the virtual world processing module 118. Assigning at least one processor 218 to an instance of the client-dedicated module 112 can provide further resources that are then available for processing of data, resulting in higher QOS and quality of experience (QOE) to the end-user. In an embodiment, contrary to typical systems that may employ one or more of standard central processing units (CPUs), graphics processing units (GPUs), the special purpose processors 218 are each tailored specifically for processing of software engines to be used in processing of at least one of 3D graphics, artificial intelligence operations, physics operations, 3D structures processing operations, simulation operations, tracking and positioning, and communications, amongst others. In some embodiments, each processor 218 may be coupled as a chip or system on an electronic chip comprising one or more specific hardware processing cores designated for processing each specific type of operation. The processing cores of the one or more electronic chips may be regarded as functional units or modules of the electronic circuits of the electronic chip designed for physically executing required algorithms of each software engine. For example, at least one of the one or more processing cores may be realized as an FPGA or any other form of an integrating circuit implementing a dedicated functionality. Accordingly, the electronic chip may include at least one integrated circuit realizing at least some of the one or more processing cores, wherein at least one of the processing cores implements the different special-purpose processors 218. These electronic chips may be installed, for example, on any or both of the one or more external servers or main servers. In some embodiments, the electronic chips may additionally comprise general-purpose processing cores, such as CPUs and/or GPUs, or may connect to external CPUs and/or GPUs for providing them with additional support for each processing task.

In some embodiments, the video encoder 220 may be configured as part of the processor 218. The video encoder 220 can comprise electronic circuitry and/or software configured to transform data into a digital format that is compatible with the client software engine 104 of the client device 106. As part of the media that is being processed and streamed to the one or more client device are live media streams, there may be virtually no capacity to buffer video frames on the client side. This is because, when a user issues a command to the client device, the command may require to traverse the network to the cloud servers 114, be processed and, optionally, rendered by the client-dedicated processing logic 222 and/or world processing logic 224, and then encoded and compressed by the video encoder 220 before being streamed back to the client device 106. Therefore, the choice of video encoder may be of high importance for embodiments of the current disclosure. In one example, a suitable encoder for use in the cloud servers 114 may be a H.264/MPEG-4 AVC encoder, which exhibits a high compression ratio and may work well with stringent real time demands.

In some embodiments, the video decoder 206 may be configured as part of the processor 204. The video decoder 206 can comprise electronic circuitry and/or software configured to convert the encoded data into a format that is useful for the client device 106, such as for any further processing that may be performed by the client processing logic 214.

Figure 3A:
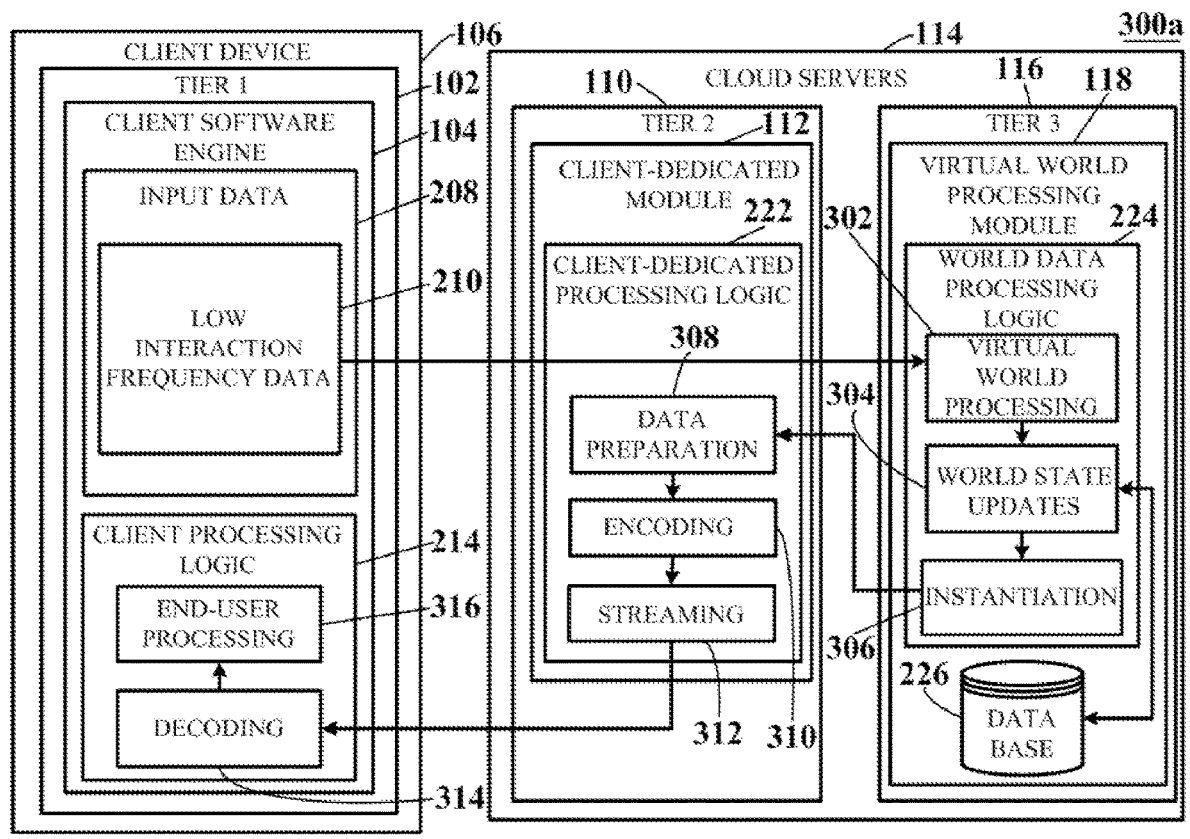
FIGS. 3A-3B depict a schematic representation of data processing implemented in the system for optimizing virtual world computations through an n-tier architecture, according to an embodiment.
Figure 3B:
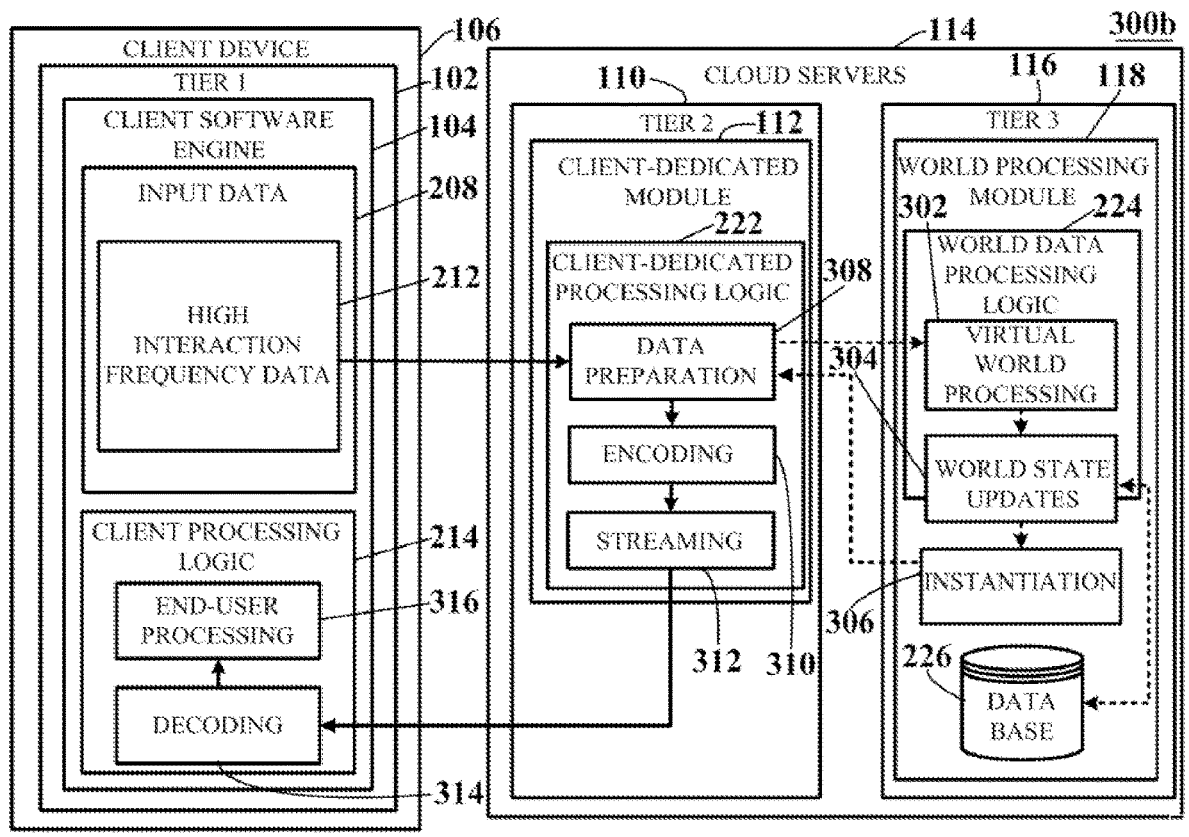

FIG. 3A-3B depict schematic representations of data process flows 300a-b implemented in a system for optimizing virtual world computations through an n-tier architecture, such as in systems shown with respect to FIGS. 1A-2. Some elements of FIGS. 3A-3B may be the same as elements of FIGS. 1A-2 and thus may utilize similar or the same reference numerals.

In FIG. 3A, data process flow 300a begins with low interaction frequency data 210 input into the client software engine 104 from the at least one client device 106. The low interaction frequency data 210 is transferred, using the client-dedicated processing logic 222 of the client-dedicated module 112, to the virtual world processing module 118. The virtual world processing module 120 then performs any required world-related processing 302 on the data, generating world state updates 304 that are stored in the database 226 and which are made available for all users of the virtual world system (e.g., virtual world system 228 of FIG. 2) therein stored. The virtual world processing module 118 then instantiates 306 the client-dedicated module 112, generating a client dedicated-instance of the client-dedicated module 112 dedicated to the at least one client device 106, which then proceeds to perform data preparation 308 on the world state updates 304 sent from the virtual world processing module 118. The prepared data is then encoded 310 and streamed 312 to the client software engine 104 through a network. The client software engine 104 proceeds to decode 314 the prepared data before performing any required end-user processing 316.

In the current disclosure, the term "instantiation" refers to the process of virtualizing a server's properties (e.g., memory, computing power, network, operating system, etc.), such as one or more cloud server computers 114, in order to create an instance of the one or more cloud server computers 114. The client-dedicated module instance is then dedicated to at least one client device 106, creating dedicated data links between the client software engine 104 and the client dedicated module 112 that require no complex data transfer protocols, which can result in a lower latency while providing a high QOS and QOE for the at least one client device 106 to which the client-dedicated module 112 is instantiated.

In FIG. 3B data process flow 300b begins with high interaction frequency data 212 input into the client software engine 104 from the at least one client device 106. The high interaction frequency data 212 is then sent to the client-dedicated module 112 of the second tier 110, where the high interaction frequency data 212 may undergo a process of data preparation 308. The prepared data may then go through a process of encoding 310 and subsequently streaming 312 to the client device 106, which may decode 314 the prepared data before performing any required end-user processing 316 through the client processing logic 214. Thus, in this embodiment, as the high interaction frequency data 212 is data that requires a fast processing because a very low delay is expected, then no world processing 302 by the third tier 116 may be required immediately, allowing for a smoother experience comprising a high QOS and QOE.

In some embodiments, if at least some of the prepared high interaction frequency data 212 may affect the virtual world system, e.g., by affecting other elements of the virtual world system and thus the experience of other users, then the at least some of the prepared high interaction frequency data 212 may be transferred to the virtual world processing module 118 to undergo any further required world processing 302, generating world state updates 304 that are stored in the database 226. The virtual world processing module 118 may continue by performing, if required, any instantiation 304 of the client-dedicated module 112 before transferring the world state updates 304 back to the client-dedicated module 112 for undergoing any further data preparation 308 tasks. The transfer of data required for the parallel or asynchronous processing that may take place at the third tier 116 while the second tier 110 is providing the typically faster processing required for the high interaction frequency data 210 is represented in FIG. 3B as dotted data flow arrows.

In some embodiments, the input data 208 received by the client software engine 104 of the first tier 102 comprises one or more of color data, geometry data, depth data, audio data, pose data, sensor data, and user input commands. In some embodiments, some of the input data 208 is metadata generated during user interactions through the client device 106.

In other embodiments, the prepared data from the client-dedicated module 112 and/or from the virtual world processing module 118 comprises color data, geometry data, depth data, and audio data that gets streamed to the client software engine 104 of the first tier 102 for implementing any required end-user processing 316. In some embodiments, some of the prepared data is metadata generated during data preparation 308 by the client-dedicated module 112 and/or during world processing 302 by the virtual world processing module 118.

In yet further embodiments, the geometry data comprises screen-space mesh grids, or proxy geometries, or combinations thereof. The screen space mesh grids are realized by a technique called screen space mesh (SSM) that generates a mesh in screen space using depth data of a set of particles. The proxy geometries refer to a simplified 3D scene that is streamed 312 by the client-dedicated module 112 to the client software engine 104. A simplified 3D scene refers to, for example, a scene that may originally comprise millions or billions of polygons, but when simplified, may comprise only few hundred thousand polygons, which may be lighter for streaming to the client device 106 for implementing further end-user processing 316.

In some embodiments, the prepared data, after being encoded 310, streamed 312 and decoded 314, can then go through end-user processing 316, which may comprise performing one or more of generating intermediary frames enabling increasing final image resolution; providing complementary image frames; interpolating frame rates; extrapolating frame rates; rendering prepared data; adjusting brightness, colors, contrast, sharpness and resolution; and overlaying image data on received data; or combinations thereof. For example, by using screen-space mesh grids and/or geometry proxies, along with the prepared color data, depth data, and audio data, the client software engine 104 may have already received enough prepared data to enable a real-time recreation of the scene through the creation of intermediary frames. In another example, through extrapolation and/or interpolation, generated intermediary frames may be used to increase the final image resolution or the frame rate of the scene. All of these actions may performed as post-processing tasks directly on the client device 106 on the prepared data, which may result in an efficient utilization of the client hardware while simultaneously providing a high degree of flexibility on the type of real-time adjustments and real-time media content editing that can take place after cloud processing from the second and/or third tiers. This may differ from typical systems employing real-time cloud computing and thin or lightweight client processing, which limit the post-processing and adjustment tasks that may be performed on the client device.

Example three-tier architectures disclosed as part of the broader n-tier architectures of the current disclosure, when comparing with conventional three-tier architectures, reduce load on the presentation tier, typically processed by client devices, by centralizing business logic to the second tier. However, current three-tier architectures do not typically enable a high level of flexibility in terms of the level of processing performed from one or the other tier, e.g., by only allowing a limited level of allocation of data and tasks to be offload to other tiers. Furthermore, during heavy clustering, conventional three-tier architectures can potentially lead to reduction of QOS and increase in latency due to traffic congestion, as more computing tasks are offloaded to the servers, thus exhibiting a limited scalability for use in massive virtual worlds. However, by adding a client-dedicated module 112 that is dynamically instantiated 306 per user by the virtual world processing module 120 and by enabling the classification of data as high and low frequency data for the determination of the tier partitioning and computing allocation, a more efficient load-balancing between cloud servers 114 and client devices 106 is achieved while maintaining a highly focalized computing per client device 106, leading also to an increase in scalability and reusability of different components in all of the tiers. A better or more efficient use of the client hardware is also enabled, as the applications can be programmed to perform certain post-processing or other computing tasks according to the physical capabilities of the client hardware. The systems and methods of the current disclosure thus enable for a scalable, flexible and efficient architecture that enables optimization of per-user computations in virtual world systems.

In some embodiments, with reference to FIGS. 3A-3B, during an application development stage, developers are enabled, through the client software engine 104 of the first tier 102 to adjust the relative amount (e.g., by percentage) of processing performed by each tier. In some embodiments, said adjustments to the relative amount of processing is performed by defining the type of data (e.g., level low interaction frequency data 210 and high interaction frequency data 212) that is processed by the client software engine 104 of the first tier 102, client-dedicated module 112 of the second tier 110, and/or by the virtual world processing module 118 of the third tier 116. In yet further embodiments, a majority of the processing is performed by the virtual world processing module 118 of the third tier 116.

Figure 4A:
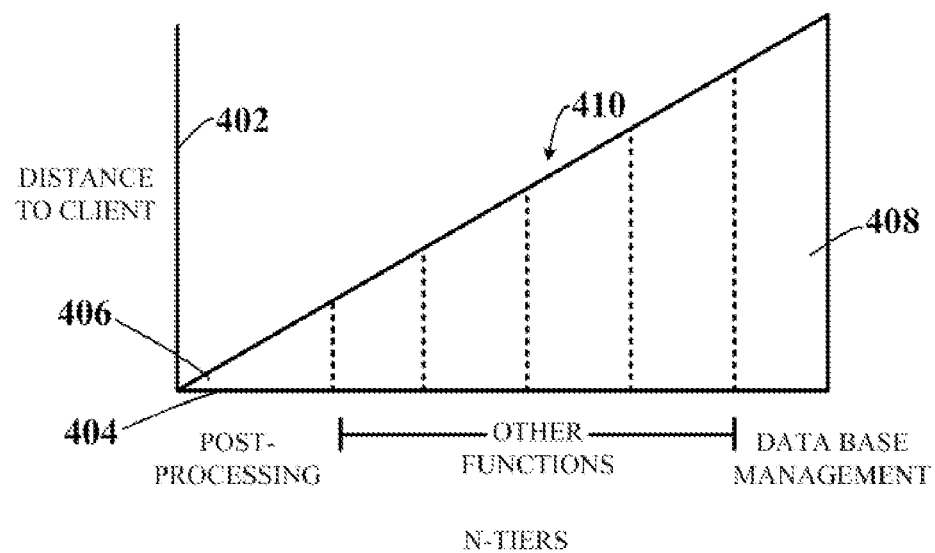
FIGS. 4A-4C depict charts illustrating the implementation of systems and methods of the current disclosure in n-tiers comprising three or more tiers, according to an embodiment.
Figure 4B:
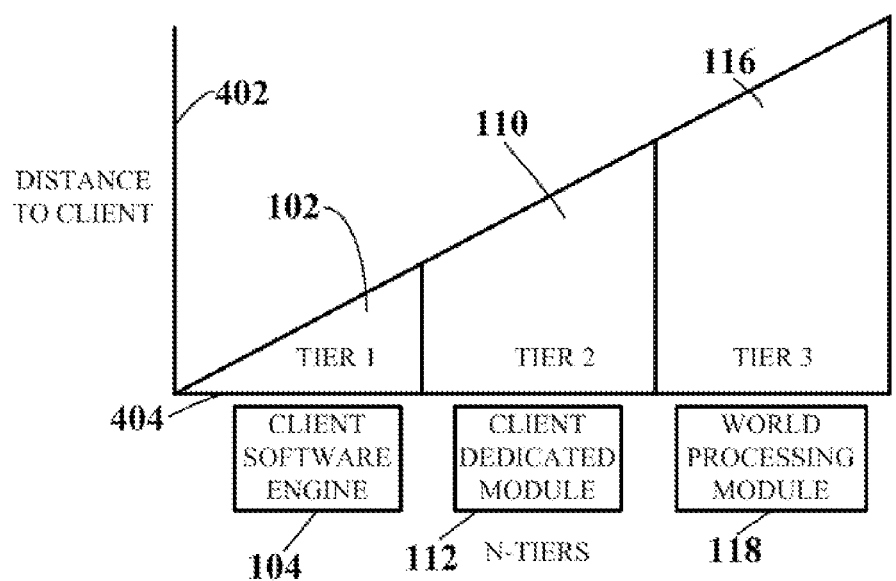
Figure 4C:
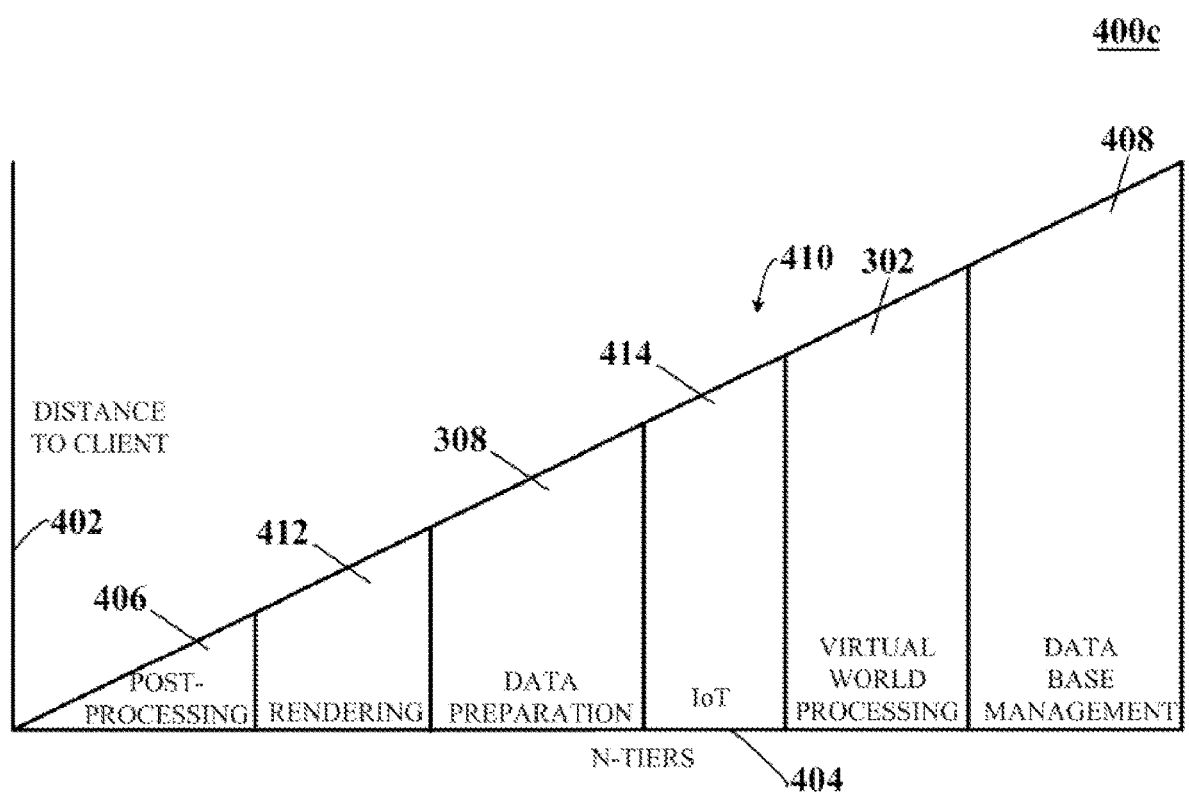

FIGS. 4A-4C depict a chart illustrating the implementation of systems and methods of the current disclosure in n-tiers 400a-c, wherein the n-tiers comprise three or more tiers. In the n-tier architectures 400a-c, an x-y axis graph is displayed showing different functions that are performed by each tier, wherein the y-axis represents the distance to the client device 402 while the x-axis represents the n-tiers 404.

Making reference to FIG. 4A, a general n-tier architecture 400a is displayed showing different functions that are performed by each tier. In the example of FIG. 4A, the first tier is configured for performing post-processing operations 406 on data input on the client device, while the last tier is configured at the far end of the x-axis for performing data base management 408. The n-tier architecture 400a further comprises other functions 410 localized in-between, as will be further illustrated with reference to FIG. 4C. The n-tiers comprise any number of necessary tiers hosted on any number of corresponding physical or virtual machines connected through a network.

With reference to FIG. 4B, an n-tier architecture 400b implemented across three tiers comprise a client software engine 104 in a first tier 102, a client dedicated module 112 in a second tier 110, and virtual world processing module 118 in a third tier 116, which may be implemented as described with the example embodiments of FIGS. 3A-3B.

With reference to FIG. 4C, an n-tier architecture 400c is implemented across six tiers, each tier configured to perform one or more functions on data input on the client device. In the example of FIG. 4C, the first tier is configured for performing post-processing operations 406 while the sixth tier is configured at the far end of the x-axis for performing data base management 408. The n-tier architecture 400c further comprises other functions 410 localized in-between. For example, the second tier is configured for performing rendering operations 412, the third tier is configured for performing data preparation 308, the fourth tier is configured for performing Internet of Things (IoT) data processing 414, and the fifth tier is configured for performing virtual world processing 302.

Figure 5:
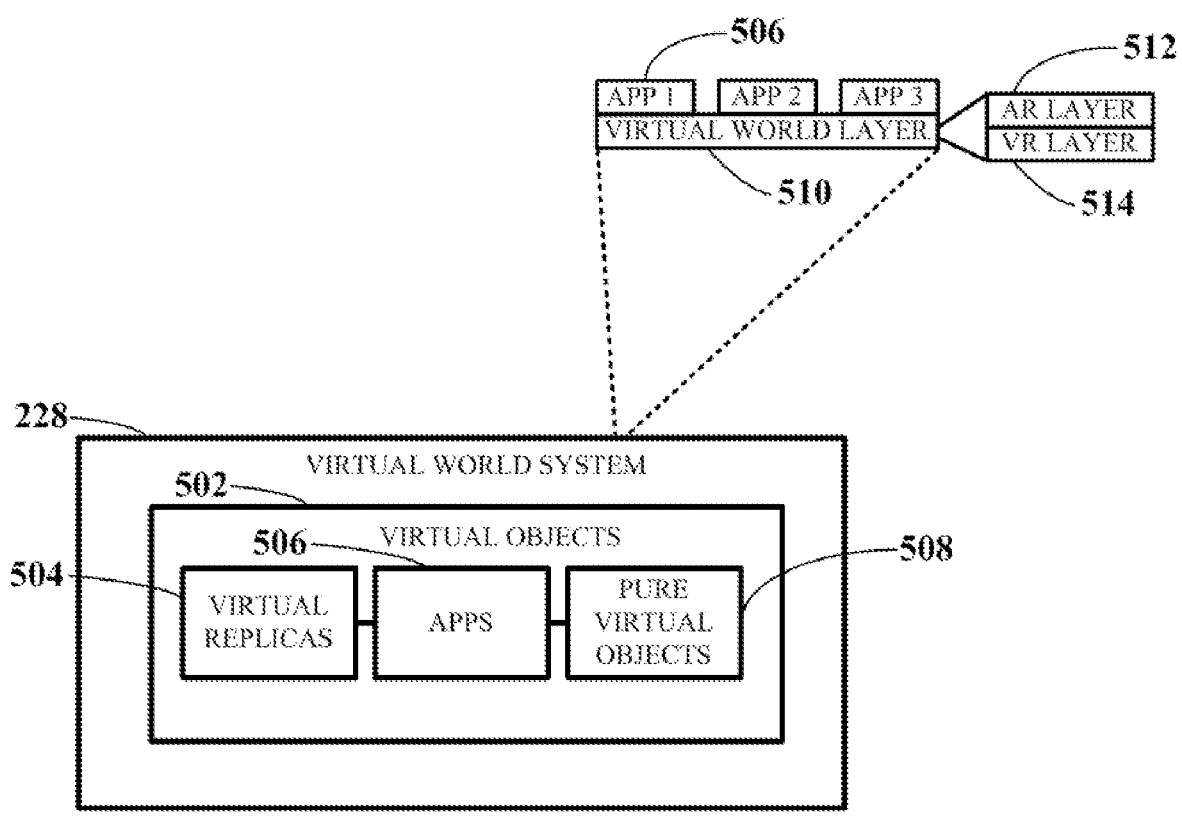
FIG. 5 depicts a schematic representation of a virtual world system that may be stored in a database connected to the virtual world processing module, according to an embodiment.

FIG. 5 depicts a schematic representation of a virtual world system 228 that may be stored a database (e.g., database 226 of FIGS. 2-3B) connected to the virtual world processing module 118 of the third tier 116, according to an embodiment.

The virtual world system 228 comprises virtual objects 502, wherein at least some of the virtual objects 502 are virtual replicas 504 of corresponding real world elements. The virtual objects 502 may further comprise applications 506 and pure virtual objects 508, e.g., objects not having a real-world counterpart. In some embodiments, the virtual world system 228 refers to a persistent virtual world system or an ad-hoc (e.g., created or processed on demand) virtual world system.

In the current disclosure, the term "persistent" is used to characterize a state of a system that can continue to exist without a continuously executing process or network connection. For example, the term "persistent" may be used to characterize the virtual world system where the virtual world system and all of the objects therein comprised continue to exist after the processes used for creating the virtual objects cease, and independent of users being connected to the virtual world system. Thus, the virtual world system is saved in a non-volatile storage location (e.g., in a server). In this way, virtual replicas, purely virtual objects and applications may interact and collaborate with each other when being configured for accomplishing specific goals even if users are not connected to the server.

In some embodiments, the persistent virtual world system 228 may comprise a virtual world layer 510 that may be separated into an augmented reality (AR) layer 512 and virtual reality (VR) layer 514. The separate layers may enable accessing the virtual world system 228 in any of augmented or virtual reality and combining elements stored in each layer, and may be activated through client devices connected the at least one cloud server computer through the network whenever accessing one or the other type of reality. Each of the layers may comprise augmentations of reality and virtual objects 502 that may be specific to each layer. For example, an AR layer 512 may comprise only virtual replicas 504, applications 506, and pure virtual objects 508 that may only be visible when accessing the persistent virtual world system 228 in augmented reality. Likewise, a VR layer 514 may comprise only virtual replicas 504, applications 506 that may only be visible when accessing the persistent virtual world system 228 in virtual reality. However, a user may decide to activate both layers, or to adjust the level of each layer, so that at least some objects of one layer are visible at another layer. For example, when accessing a scene in virtual reality, it may be possible to activate the AR layer 512 enabling to view augmentations of real objects that are virtualized in the VR layer 514, such as seeing further descriptions of a building or touristic site.

In some embodiments, the virtual world system 228 is further subdivided into a plurality of sub-universes, each sub-universe comprising a plurality of sub-universe specific virtual objects 502. For example a sub-universe for a city may be referred to as a city-verse, which may represent all of the buildings, trees, people, streets, traffic lights, vehicles, etc., of a city and their relationships, interactions and context. There may also be a sub-universe within another sub-universe, such as a house-verse within a city-verse. A house-verse may include the 3D design of the exterior and interior of the house, all the appliances, people, walls, energy consumption data, etc., of a house. A network of all sub-universes may form a universe of a persistent virtual world system that may be viewed in virtual or augmented reality. Each of these sub-universes may be dynamically partitioned into a plurality of cells where resources are dynamically allocated.

In the current disclosure, the term "virtual replica" refers to an accurate and persistent virtual representations of real-world elements. In an embodiment, virtual replicas 504 of the current disclosure refer to a virtual version, or virtual twin, of a real-world element, or real twin, which may either be mapped or modeled through computer assisted drawing (CAD) or computer-assisted engineering (CAE) methods, input by computer models of the real objects (e.g., building information models—BIMs) or other suitable methods, and which may mirror not just the appearance but also the behavior of the real twin. The real-world objects may additionally include sensors that can provide the virtual replicas 504 with multi-source input data for enriching and synchronizing the virtual replicas 504 with their respective real counterpart. In the current disclosure, the term "enriching" is used to describe the act of providing further properties to a virtual replica, e.g., based on the multi-source data. For example, enriching the virtual replicas may refer to providing real-world data captured from sensor mechanisms on a plurality of devices, wherein the further real-world data comprises video data, temperature data, real-time energy consumption data, real-time water consumption data, speed or acceleration data, and the like.

In some embodiments, a virtual replica 504 includes one or more of 3D world and building data, such as SLAM or derivate-mapping based data; 3D geometry data; 3D point cloud data; or geographic information system data representing real-world structural properties that may serve to model a 3D structure.

In some embodiments, the applications 506 can be one or more traditional applications, distributed applications or decentralized applications. Traditional applications are typically based on a traditional client-server model and run on a dedicated server in a static infrastructure. Distributed applications are applications stored mostly on cloud computing platforms, such as cloud servers of the current disclosure, and may run on multiple systems and devices simultaneously on the same network, or may run on blockchain or distributed ledger-based distributed databases. Decentralized applications run mainly on decentralized infrastructures such as in blockchains or distributed ledger-based distributed databases.

In some embodiments, the interaction mechanics with and between virtual objects 502 are defined through the use of computer code included in computer scripts and computer programs, and may be enabled through applications, smart contracts, or combinations thereof provisioned in the virtual world system 228 where the interactions and interaction applications take place. The applications, smart contracts or combinations thereof thus enable digitally codifying and representing the possible and desired interactions and inter-action interfaces between all elements of the real world through the virtual world system 228. Interactions may be experienced by users in the form of interactive game-like applications or through game-like interaction mechanics.

Figure 6:
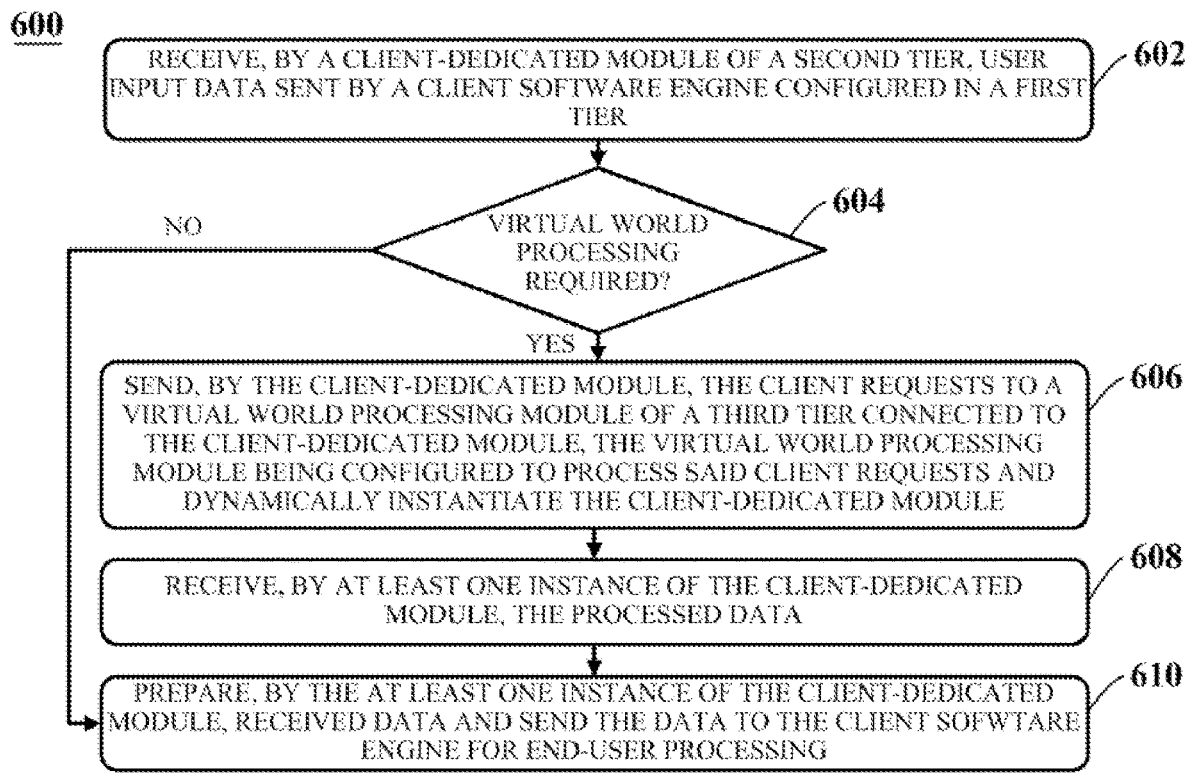
FIG. 6 depicts a schematic representation of a method for optimizing virtual world computations through an n-tier architecture, according to an embodiment.

FIG. 6 depicts a schematic representation of a method 600 for optimizing virtual world computations through an n-tier architecture, according to an embodiment. The method 600 may be implemented by a system, such as systems 100*a*-200 shown in FIGS. 1A-2, and may use a data process flow, such as data process flows 300*a-b* of FIGS. 3A-3B.

According to an embodiment, the method 600 begins in step 602 by receiving, by a client-dedicated module of a second tier, user input data sent by a client software engine configured in a first tier and connected to the second tier through a network. Subsequently, in step 604, the method continues by checking whether virtual world processing is required. If virtual world processing module services are required, the method 600 proceeds in step 606 by sending, by the client-dedicated module, the input data to a virtual world processing module of a third tier connected to the client-dedicated module through the network. In some embodiments, the virtual world processing module is configured to process said input data in order to generate world state updates, and to dynamically instantiate the client-dedicated module to spawn client-dedicated module instances. Then, the method 600 continues in step 608 by receiving, by at least one instance of the client-dedicated module, the world state updates. The method 600 may then end in step 610 by further processing, by the client-dedicated module, the world state updates.

If virtual world processing module services are not immediately required, the method 600 may go from step 604 directly to step 610 by preparing data by the client-dedicated module received from the client software engine, and sending the prepared data to the client software engine for performing end-user processing of requests.

In some embodiments, the method 600 further comprises, by the client engine of the first tier, identifying data as high interaction frequency data or low interaction frequency data, wherein the high interaction frequency data is processed by the client-dedicated module of the second tier, and wherein the low interaction frequency data is sent to the virtual world processing module for processing thereby in order to generate world state updates.

In some embodiments, the method 600 further comprises, during instantiation of the client-dedicated module by the virtual world processing module, assigning at least one processor to one or more client devices, wherein the at least one processor of the at least one cloud server computer comprises a generic processing unit, a special-purpose processing unit, or a combination thereof.

In some embodiments, the input data received by the client software engine comprises one or more of color data, geometry data, depth data, audio data, pose data, sensor data, and user input commands. In another embodiment, the prepared data from the client-dedicated module comprises color data, geometry data, depth data, and audio data that gets streamed to the client software engine of the first tier. In further embodiments, the method further comprises encoding of prepared data before being streamed to the client software engine.

In some embodiments, the method 600 further comprises, by the client software engine, performing one or more of generating intermediary frames enabling increasing final image resolution; providing complementary image frames; interpolating frame rates; extrapolating frame rates; rendering prepared data; adjusting brightness, colors, contrast, sharpness and resolution; decoding data; and overlaying image data on received data; or combinations thereof.

In some embodiments, the method 600 further comprises, during an application development stage via the client software engine, adjusting the percentage of processing performed by each tier, wherein a majority of the processing is performed at the third tier.

While certain embodiments have been described and shown in the accompanying drawings, it is to be understood that such embodiments are merely illustrative of and not restrictive on the broad disclosure, and that the disclosure is not limited to the specific constructions and arrangements shown and described, since various other modifications may occur to those of ordinary skill in the art. The description is thus to be regarded as illustrative instead of limiting.

The embodiments of the invention in which an exclusive property or privilege is claimed are defined as follows:

1. A computer system implementing an n-tier 3D engine architecture comprising:
   a first tier comprising a client software engine configured to:
      receive input data,
      send the input data to a second tier, and
      perform end-user processing of the input data;
   the second tier connected to the first tier and to a third tier through a network, the second tier comprising:
      a client-dedicated module that is dynamically instantiated per client device by the third tier and which is configured to, depending on the type of input data, either prepare the input data for subsequent processing from the client software engine of the first tier, or send the input data to the third tier; and
   the third tier comprising:
      a virtual world processing module configured to receive and process the input data from the second tier in order to generate world state updates, and to dynamically instantiate the client-dedicated module to spawn client-dedicated module instances,
      wherein the world state updates are sent to corresponding client-dedicated module instances for further processing.

2. The computer system of claim 1, wherein the client software engine is stored in memory of at least one client device and is executed by at least one processor of the at least one client device, and
   wherein the client-dedicated module and the virtual world processing module are stored in memory of one or more cloud server computers and are executed by at least one processor of the one or more cloud server computers.

3. The computer system of claim 1, wherein the n-tier 3D engine architecture is implemented in a cloud-to-edge infrastructure employing computing devices and systems comprising:
   public or private clouds,
   fog servers,
   cloudlets,
   edge devices,
   combinations thereof, or
   in a distributed ledger.

4. The computer system of claim 1, wherein the client software engine is further configured to identify one or more portions of the input data for processing by the client-dedicated module or the virtual world processing module.

5. The computer system of claim 1, wherein the at least one processor is assigned on demand to one or more client devices during per client instantiation via the virtual world processing module.

6. The computer system of claim 1, wherein the input data received by the client software engine comprises one or more of:
   color data,
   geometry data,
   depth data,
   audio data,
   pose data,
   sensor data, and
   user input commands.

7. The computer system of claim 1, wherein the n-tier 3D engine architecture enables, through the client software engine, adjustments to an amount of processing performed by each tier.

8. The computer system of claim 1, wherein the third tier comprises a virtual world system,
   wherein the virtual world system comprises a plurality of sub-universes, each sub-universe comprising a plurality of virtual objects,
   wherein at least some of the plurality of virtual objects are virtual replicas of corresponding real world objects located in corresponding areas of the real world, and
   wherein processing by the virtual world processing module is performed on the plurality of virtual objects within areas of interest.

9. The computer system of claim 8, wherein the virtual world processing module is further configured to provision one or more application services, and
   wherein said provisioning is based at least in part on a spatial context associated with one or more content contexts through the virtual world system.

10. The computer system of claim 9, wherein said spatial context is classified into a micro-context or macro-context.

11. A method comprising:
   receiving, by a client-dedicated module of a second tier of an n-tier architecture, input data from a client software engine configured in a first tier of the n-tier architecture connected to the second tier through a network;
   sending, by the client-dedicated module, a first portion of the input data to a virtual world processing module of a third tier of the n-tier architecture connected to the client-dedicated module through the network, the virtual world processing module being configured to process the first portion of the input data in order to generate world state updates, and to dynamically instantiate the client-dedicated module to spawn client-dedicated module instances,
   wherein the world state updates are sent to corresponding client-dedicated module instances;
   receiving, by the client-dedicated module, the world state updates;
   processing, by the client-dedicated module, the world state updates,
   wherein said processing is performed on a per-client basis;
   sending the processed world state updates to the client software engine for performing end-user processing of requests;
   preparing, by the client-dedicated module, a second portion of the input data received from the client software engine, and
   sending the prepared data to the client software engine for performing end-user processing of requests.

12. The method of claim 11, wherein the client software engine is stored in memory of at least one client device and is executed by at least one processor of the at least one client device, and
   wherein the client-dedicated module and the virtual world processing module are stored in memory of one or more cloud server computers and are executed by at least one processor of the one or more cloud server computers.

13. The method of claim 11, further comprising:
identifying, by the client software engine, the second portion of the input data for processing by the client dedicated module, and
identifying the first portion of the input data for processing by the virtual world processing module.

14. The method of claim 11, further comprising:
assigning, during instantiation of the client-dedicated module by the virtual world processing module, at least one processor to one or more client devices.

15. The method of claim 11, wherein the input data received by the client software engine comprises one or more of:
color data,
geometry data,
depth data,
audio data,
pose data,
sensor data, and
user input commands.

16. The method of claim 11, further comprising:
adjusting, during an application development stage via the client software engine, an amount of processing performed by each tier.

17. The method of claim 11, wherein the third tier comprises a virtual world system,
wherein the virtual world system includes a plurality of sub-universes, each sub-universe comprising a plurality of virtual objects,
wherein at least some of the plurality of virtual objects are virtual replicas of corresponding real world objects located in corresponding areas of the real world, and
wherein processing by the virtual world processing module is performed on the plurality of virtual objects within areas of interest.

18. The method of claim 17, further comprising:
provisioning, by the virtual world processing module, one or more application services,
wherein and the provisioning is based at least in part on a spatial context associated with one or more content contexts through the virtual world system, and
wherein said services are allocated and sent to the corresponding client software engine on request through the corresponding client-dedicated module.

19. The method of claim 18, wherein said spatial context is classified into a micro-context or macro-context.

20. A non-transitory computer-readable medium having stored thereon instructions configured to cause one or more computers to perform steps comprising:
receiving, by a client-dedicated module of a second tier of an n-tier architecture, input data from a client software engine configured in a first tier of the n-tier architecture connected to the second tier through a network;
sending, by the client-dedicated module, a first portion of the input data to a virtual world processing module of a third tier of the n-tier architecture connected to the client-dedicated module through the network, the virtual world processing module being configured to process the first portion of the input data in order to generate world state updates, and to dynamically instantiate the client-dedicated module to spawn client-dedicated module instances,
wherein the world state updates are sent to corresponding client-dedicated module instances;
receiving, by the client-dedicated module, the world state updates;
processing, by the client-dedicated module, the world state updates,
wherein said processing is performed on a per-client basis;
sending the processed world state updates to the client software engine for performing end-user processing of requests;
preparing, by the client-dedicated module, a second portion of the input data received from the client software engine, and
sending the prepared data to the client software engine for performing end-user processing of requests.

* * * * *